United States Patent
Yamada et al.

(10) Patent No.: US 6,787,727 B2
(45) Date of Patent: Sep. 7, 2004

(54) AUTOMATIC WIRE ELECTRODE FEEDER FOR WIRE ELECTRIC DISCHARGE MACHINING DEVICES

(75) Inventors: Hisashi Yamada, Tokyo (JP); Takuji Magara, Tokyo (JP); Yutaka Terada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/203,270

(22) PCT Filed: Jan. 16, 2001

(86) PCT No.: PCT/JP01/00216
§ 371 (c)(1),
(2), (4) Date: Aug. 8, 2002

(87) PCT Pub. No.: WO02/055251
PCT Pub. Date: Jul. 18, 2002

(65) Prior Publication Data
US 2003/0010753 A1 Jan. 16, 2003

(51) Int. Cl.⁷ .................................................. B23H 7/10
(52) U.S. Cl. .................................................. 219/69.12
(58) Field of Search ........................................ 219/69.12

(56) References Cited
U.S. PATENT DOCUMENTS 5,045,662 A * 9/1991 Yamada ..................... 219/69.12
5,302,796 A * 4/1994 Kuriki ....................... 219/69.12
5,603,851 A * 2/1997 Noda et al. ............... 219/69.12

FOREIGN PATENT DOCUMENTS

| JP | 62-162425 A | * | 7/1987 |
| JP | 63-185532 A | * | 8/1988 |
| JP | 2-160422 | | 6/1990 |
| JP | 4-111717 | | 4/1992 |
| JP | 5-305523 | | 11/1993 |
| JP | 7-24643 A | * | 1/1995 |
| JP | 9-108950 A | * | 4/1997 |

* cited by examiner

*Primary Examiner*—Geoffrey S. Evans
(74) *Attorney, Agent, or Firm*—Sughrue Mion, PLLC (57) ABSTRACT

An automatic wire feeder of a wire electric discharge machine includes an optical sensor for detecting positional information of a wire electrode in an inserting passage between a feed roller for feeding a wire electrode and an upper wire guide; and a control unit for discriminating a state of vibration or deflection of the wire electrode according to the positional information detected by the optical sensor and also for controlling a feeding and rewinding motion of the feed roller according to a quantity of deflection of the wire electrode. Due to the foregoing, buckling caused by an inserting load in the process of automatic wire connection can be positively detected, and the reliability can be enhanced and further the repetition of connecting the wire again can be reduced.

4 Claims, 6 Drawing Sheets

AUTOMATIC WIRE ELECTRODE FEEDER FOR WIRE ELECTRIC DISCHARGE MACHINING DEVICES

This application is a National Stage Entry Under 35 U.S.C. § 371 of PCT/JP01/00216, filed Jan. 16, 2001.

TECHNICAL FIELD

The present invention relates to an automatic wire electrode feeder of a wire electric discharge machine for machining a workpiece by electric discharge energy when an electric discharge is generated between the traveling wire electrode and the workpiece.

BACKGROUND ART

In the case of machining a workpiece by a wire electric discharge machine, in general, in the initial stage of electric discharge machining, while a wire electrode, which will be referred to as a wire hereinafter, is being inserted into an initial hole, electric discharge machining is started, and the wire is cut off at the end of electric discharge machining, and then the process proceeds to a position at which machining of the next profile is started. Accordingly, in order to automatize electric discharge machining, it is necessary to automatize the processes of inserting the wire into the initial hole and connecting the wire, and further it is necessary to automatize the processes of cutting off and recovering the wire. Therefore, in order to automatize the above processes, the technique of an automatic wire feeder, in which the wire is automatically connected and cut off, has been conventionally put into practical use.

In this connection, when the wire is automatically connected, an end of the wire, which has been cut off, is automatically sent out by a motor and others, and it is necessary for the wire to be inserted into small portions which are provided in: the inserting passage such as an upper and a lower guide for supporting the wire on the upper and lower sides; an upper and a lower electric contact piece for supplying an electric discharge machining current to the wire, an initial hole formed in the workpiece; and a recovery mechanism for recovering the workpiece. Therefore, when the wire is given a heavy frictional load in each portion described above in the process of automatic wire connection, or when the wire is caught by each portion described above, it is impossible for the wire to be smoothly inserted, and a portion of the wire is buckled up in the wire inserting passage. When the wire is buckled up in this way and the feeding of the wire is continued, the wire is forced out from the inserting passage at the buckling position, and the feeding of the wire end portion is stopped and the wire connecting motion is completely stopped.

In order to cope with this situation, Japanese Unexamined Patent Publication No. 01-274926 discloses a technique, which is described as follows. When it is detected that the wire electrode is not engaged with the wire recovery device in the process of automatic feeding of the wire, the process is returned to the initial stage. When it is detected that the process has been returned to the initial stage, a command to feed the wire again is given so as to start wire feeding. According to this technique, when the frictional load is positively heavy or the wire is caught by the inserting passage, it is possible to connect the wire once more even after a failure of connecting it. However, this technique is disadvantageous as follows. Since it takes time for the wire to be engaged with the wire recovery device, the detection time is extended. Further, since the process must be returned to the initial stage each time, the entire process time from the detection of failure of connecting the wire to the success of connecting the wire is greatly extended.

Further, when the buckled portion is located at a position lower than the cutting mechanism, it is possible to restore the machine to its original state by cutting and removing this buckled portion. However, when the buckled portion is located at a position higher than the cutting mechanism, it is impossible to remove this buckled portion, that is, it is difficult to automatically restore the machine to its original state. Unless the above problems are solved, operation of the machine is completely stopped.

On the other hand, Japanese Unexamined Patent Publication No. 02-160422 discloses the following technique. In an upper portion of the wire guide pipe, there is provided a buckling detecting member having a passage made of conductive material, the diameter of which is large. Also, there is provided a buckling detecting circuit for detecting a change in voltage impressed between the buckling detecting member and the electric contact piece of the upper guide block. When buckling of the wire is detected, the wire is rewound to the initial state and the wire connecting work is repeated. However, in the case where buckling is electrically detected as described above, the buckled portion must be specified by the detecting section, which is disadvantageous. Further, in order to increase the sensitivity of detection, it is necessary to decrease clearance between the electric contact section and the wire as small as possible. When the clearance of the detecting section is decreased, it becomes difficult for buckling to be caused in this portion, and buckling is caused in other open portions, which is an incompatible problem.

Further, Japanese Unexamined Patent Publication No. 62-162425 discloses a technique which will be described as follows. A deviation of the wire from a predetermined passage is detected by an optical sensor, and a wire drawback means is operated so as to draw the wire by a predetermined length so that looseness of the wire can be removed, and the automatic wire connection is started again. However, this technique is disadvantageous as follows. In order to positively remove looseness of the wire, it is necessary to provide a mechanism capable of being used as a wire draw-back means. Further, when looseness of the wire can not be completely removed by the above wire draw-back means, it is necessary to execute the wire winding motion by the feed motor. Therefore, it takes long time to start automatic wire connection again.

Accordingly, in order to prevent buckling of the wire caused in the wire inserting passage in the process of automatic wire connection and in order to realize a quick automatic wire connection even if the wire is given a load in the inserting passage, it is necessary to provide a large open space in the wire inserting passage and use a sensor, the detecting sensitivity of which is high, and it is also necessary to positively and quickly conduct a feeding and rewinding motion of the wire by the feed motor. However, when the feeding and the rewinding motion of the wire are continuously conducted, the wire is vibrated. Accordingly, it is necessary to instantaneously distinguish between a state of deflection of the wire in the wire inserting passage and a state of vibration of the wire, the deflection of which is small.

DISCLOSURE OF THE INVENTION

The present invention has been accomplished to solve the above problems. It is an object of the present invention to positively detect the occurrence of buckling caused by an inserting load when a wire is automatically connected. It is another object of the present invention to reduce the time necessary for reconnecting the wire and enhance the reliability.

An automatic wire feeder of a wire electric discharge machine of the first invention comprises: an optical sensor for detecting positional information of a wire electrode in an inserting passage between a feed roller for feeding a wire electrode and an upper wire guide; and a control unit for discriminating a state of vibration or deflection of the wire electrode according to the positional information detected by the optical sensor and also for controlling a feeding and rewinding motion of the feed roller according to a quantity of deflection of the wire electrode.

An automatic wire feeder of a wire electric discharge machine of the second invention comprises a control unit, wherein the control unit stops a feeding motion of the feed roller when the quantity of deflection of the wire electrode is increased by a predetermined quantity in the feeding motion of the feed roller, the control unit starts rewinding after a predetermined period of time, the control unit stops rewinding when the quantity of deflection of the wire electrode is decreased by a predetermined quantity in the rewinding motion, and the control unit starts feeding the wire electrode after a predetermined period of time.

An automatic wire feeder of a wire electric discharge machine of the third invention comprises a rate changeover means, wherein the rate changeover means reduces a feeding rate of the feed roller according to the number of times of execution of the rewinding motion.

An automatic wire feeder of a wire electric discharge machine of the fourth invention is characterized in that a direction in which the directivity of the optical sensor is narrow is made to agree with a direction of the normal line of the surface of the pinch roller and capstan roller for feeding the wire electrode.

BEST MODE FOR CARRYING OUT THE INVENTION

Embodiment 1

Figure 1:
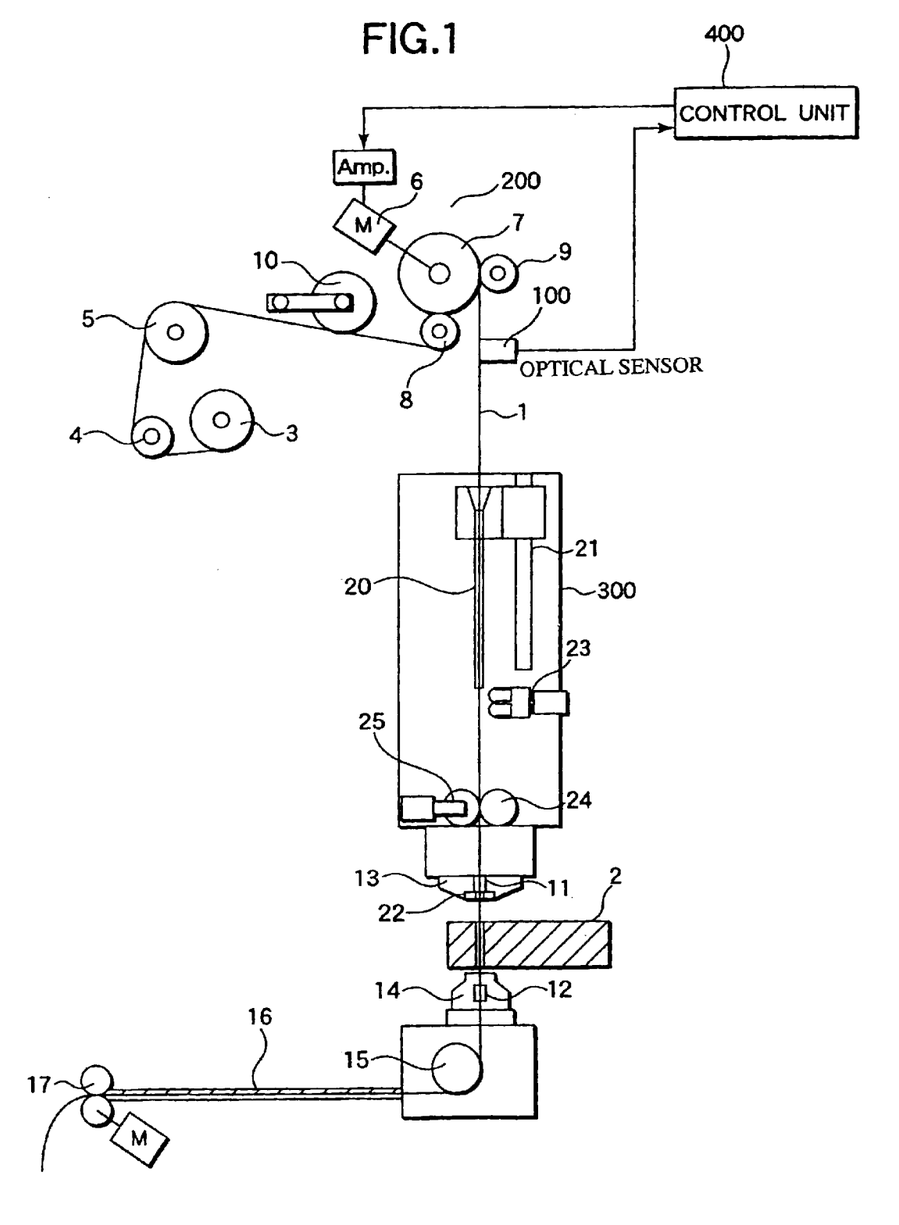
FIG. 1 is an arrangement view showing the first embodiment of the present invention.

Referring to FIG. 1, an arrangement of the wire electric discharge machine of the first embodiment of the present invention will be explained below.

In FIG. 1, reference numeral 1 is a wire electrode, which will be referred to as a wire hereinafter, reference numeral 2 is a workpiece, reference numeral 3 is a wire bobbin for supplying the wire 1, reference numerals 4 and 5 are pulleys for converting a traveling passage of the wire 1, reference numeral 6 is, for example, a torque motor to compose a tension control unit, reference numeral 7 is a capstan roller with which the torque motor 6 is connected, reference numerals 8 and 9 are pinch rollers, each pinch roller composing a pair with the capstan roller 7, and reference numeral 10 is a tension pulley for giving tension to the wire so as to absorb deflection of the wire 1 in the wire passage between the pulley 5 and the pinch roller 8. Reference numeral 11 is an upper wire guide, reference numeral 12 is a lower wire guide, reference numeral 13 is an upper machining solution nozzle for jetting out a machining solution from an upper portion of the workpiece 2, reference numeral 14 is a lower machining solution nozzle for jetting out a machining solution from a lower portion of the workpiece 2, reference numeral 15 is a roller for converting a traveling direction of the wire 1 passing through the lower wire guide 12 from a machined portion when the workpiece 2 is machined, reference numeral 16 is a guide pipe, and reference numeral 17 is a winding roller for holding and winding the wire 1. In this connection, the torque motor 6, pinch roller 8, capstan roller 7 and pinch roller 9 compose the tension control section 200.

In the wire electric discharge machine composed as described above, the wire 1 is sent out from the wire bobbin 3, and the traveling direction of the wire 1 is changed by the pulleys 4, 5. Then, the wire 1 passes through the tension roller 10, tension control section 200, automatic wire feeder body 300 described later, and upper wire guide 11. After electric discharge has been conducted between the wire 1 and the workpiece 2, the wire 1 passes through the lower wire guide 12, roller 15 and guide pipe 16. Then, the wire 1 is wound up by the winding roller 17 and recovered into a recovery box not shown. On the other hand, ion exchanging water is supplied to the upper machining solution nozzle 13 and the lower machining solution nozzle 14 from a machining solution supply device not shown. The thus supplied machining solution is jetted out to a machined portion of the workpiece 2 coaxially with the wire 1.

The pinch rollers 8, 9 composing the tension control section 200 are rollers to press the wire 1 so that the wire 1 can be contacted with the capstan roller 7 with a sufficiently strong frictional force. The torque motor 6 controls tension of the wire 1 via the capstan roller 7 so that an intensity of the tension of the wire 1 can be kept constant when the torque motor 6 generates a constant intensity of torque in a direction opposite to the feeding direction of the wire 1 in the case of machining the workpiece. When a servo motor is used for the torque motor 6 and the feeding rate is fed back by using a tachometer or a rotary encoder, it possible to control a rotation of the capstan roller 7 so that the capstan roller 7 can be rotated at a constant rate in a wire feeding or wire rewinding direction when an automatic wire connection is conducted.

Next, an arrangement of the automatic wire feeder body 300 will be explained below.

In FIG. 1, reference numeral 20 is a pipe guide to restrict an inserting passage of the wire 1 in the automatic wire feeder body 300, reference numeral 21 is a linear cylinder for elevating the pipe guide 20 by air pressure, and reference numeral 22 is a jet nozzle to form a machining start hole for starting machining the workpiece 2 from the upper wire guide 11 and to form a water column for restricting an insertion of the wire 1 to the lower wire guide 12.

In the automatic wire feeder body 300, the mechanism is composed as follows. When an automatic wire connecting motion is started, a forward end portion of the wire 1, which is located in the cutting electric contact section 23 described later, is sent out by the capstan roller 7, the rotation of which is controlled at a constant rate. In this case, the capstan roller 7 is rotated clockwise in FIG. 1. At the same time, the pipe guide 20 is lowered, and a forward end portion of the pipe guide 20 reaches a position close to the upper wire guide 11. The forward end portion of the wire 1 passes in the pipe guide 20 when the capstan roller 7 is rotated. Then, the forward end portion of the wire 1 passes through the upper wire guide 11 and the jet nozzle 22. After that, the forward end portion of the wire 1 passes in the machining start hole formed in the workpiece 2 and reaches the lower wire guide 12. During this motion, the wire 1 is restricted by the water column jetted out from the jet nozzle 22. Further, the traveling direction of the wire 1 is changed by the roller 15 by an angle of about 90°. After that, the wire 1 passes in the recovery pipe 16 and reaches the winding roller 17. In this way, the automatic wire connection is completed. Reference numeral 100 is a load detecting device, for example, an optical sensor. This load detecting device 100 detects a state in which it becomes impossible to conduct an automatic wire connection when the wire electrode 1 can not be smoothly fed because of an obstruction caused by friction in the inserting passage, a load given to the wire 1 by an attached object to the inserting passage and a load given to the wire 1 according to an uneven surface in the machining starting hole formed in the workpiece 2. For example, an optical type proximity sensor can be used for the load detecting device 100.

In this connection, the automatic wire feeder is provided with an automatic cutting function in addition to the automatic connecting function. According to the automatic cutting function, the wire electrode 1 is automatically cut off in the case of retrial in which the wire connection is conducted once more from the beginning by cutting off the wire 1 when the automatic connecting motion has not been completed, and also the wire electrode 1 is automatically cut off in the case of breaking of the wire 1 and also in the case of completion of electric discharge machining. In FIG. 1, reference numeral 23 is an cutting electric contact section, reference numeral 24 is a capstan roller used for cutting, and reference numeral 25 is a pinch roller. In the case of retrial motion and also in the case of breaking of the wire, while the wire 1 is being given tension between the capstan roller 7 and the capstan roller 24 for cutting and also between the capstan roller 7 and the pinch roller 25 for cutting, an electric current is made to flow in a pair of electric feeder pieces of the cutting electric contact section 23. Due to the foregoing, the wire 1 is fused off at a position close to the cutting electric contact section 23. In the same manner, while the wire 1 is being given tension between the capstan roller 7 and the winding rollers 17, 18, at the end of electric discharge machining, an electric current is made to flow between a pair of electric feeder pieces of the cutting electric contact section 23. Due to the foregoing, the wire 1 is fused off at a position close to the cutting electric contact section 23.

Next, referring to FIGS. 1 to 3, operation of the optical sensor 100 used in the first embodiment of the present invention will be explained below.

Figure 2:
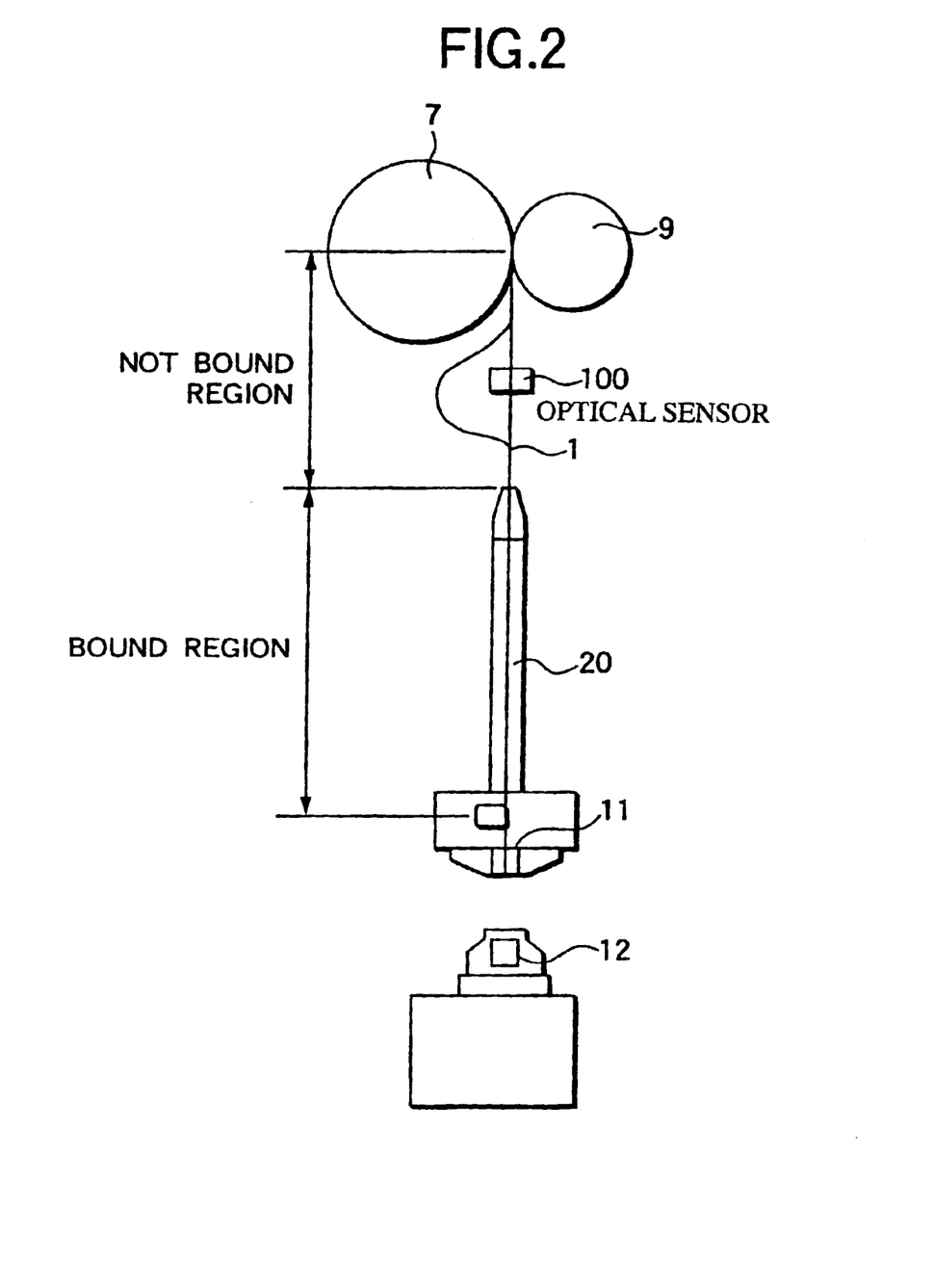
FIG. 2 is a schematic illustration for explaining an optical sensor used for the invention.

In FIGS. 1 and 2, the optical sensor 100 is arranged at a position where the wire 1 is not bound with respect to buckling of the wire 1 caused between the capstan roller 7 and the pipe guide 20 when the wire 1 is sent out by the capstan roller 7 in the process of automatic wire connection. Since the mechanism is composed in such a manner that the wire 1 is bound against buckling between the entrance of the pipe guide 20 and the winding roller 17, the optical sensor 100 is arranged at the position where the wire 1 is not bound with respect to buckling caused in the wire 1. In this connection, reference numeral 400 is a control unit described later.

Figure 3:
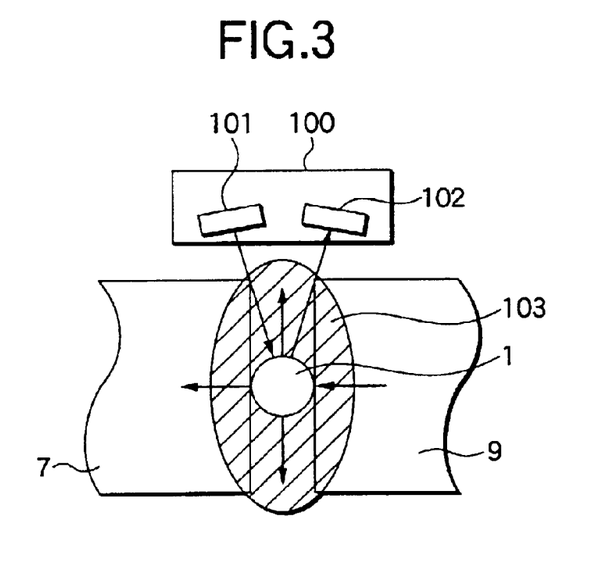
FIG. 3 is a schematic illustration for explaining the principle of an optical sensor used for the invention.

FIG. 3 is a view showing a positional relation between the optical sensor 100 and the wire 1, wherein the view is taken from an upper portion. In FIG. 3, reference numeral 101 is a light emitting section, and reference numeral 102 is a light receiving section. Ultraviolet rays emitted from the light emitting section 101 are reflected on a surface of the wire 1, and the reflected light is detected by the light receiving section 102. Reference numeral 103 is a detecting region. When an inserting load is light in the automatic wire connecting process, the wire 1 is located in the detecting region while the wire 1 is being a little vibrated. However, when an inserting load is heavy in the automatic wire connecting process, the wire 1 is forced outside of the detecting region and buckled up. In this case, since the wire 1 is not bound in the tangent direction of the capstan roller 7 and the pinch roller 9, the wire 1 can be somewhat moved. Therefore, it is preferable to use a sensor having a directivity in the tangent and the normal line direction. This directivity of the sensor is shown by a hatched portion in the view. Due to the foregoing, the detection range can be extended with respect to the vibration of the wire 1 in the tangent direction of the capstan roller 7 and the pinch roller 9, and it become possible to prevent the occurrence of an over-detection. On the contrary, it becomes possible to enhance the detecting sensitivity by reducing the detecting range in the normal line direction.

Reference numeral 400 is a control unit. In order to avoid the occurrence of buckling of the wire 1 in the automatic wire connecting process, the control unit 400 controls the torque motor 6 by an output of the optical sensor 100 so that feeding and rewinding of the wire 1 can be controlled.

Figure 4:
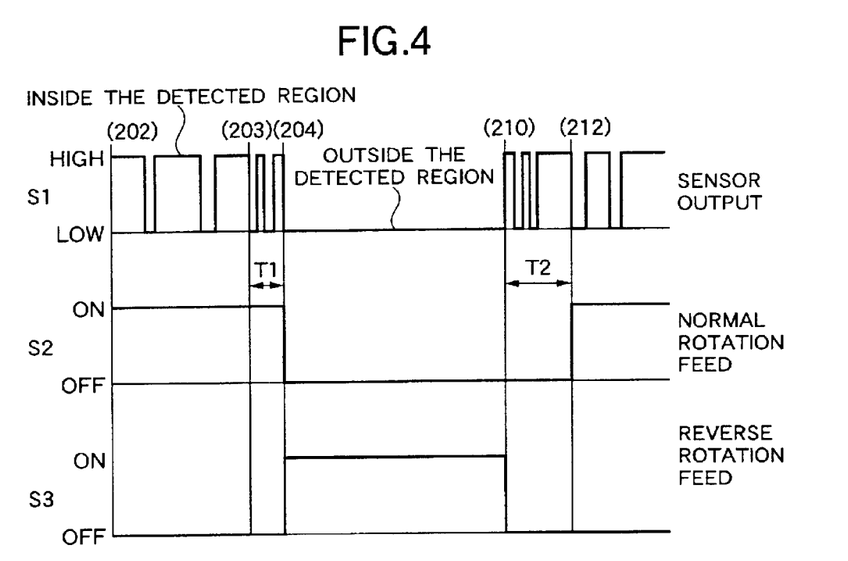
FIG. 4 is a schematic illustration for explaining the operation of an optical sensor used for the invention.
Figure 5:
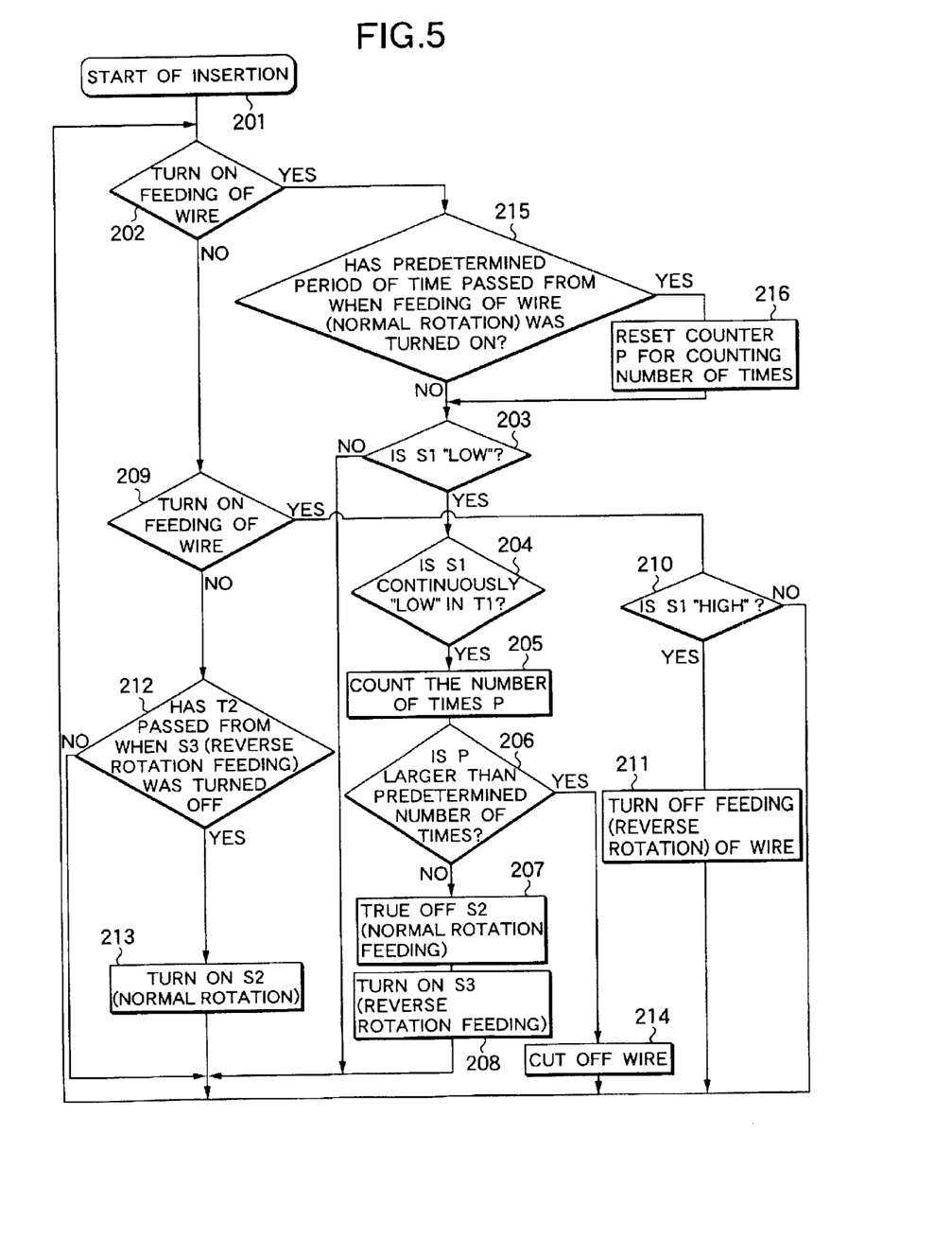
FIG. 5 is a flow chart for explaining the operation of an automatic wire electrode connecting process showing the first embodiment of the invention.

FIG. 4 is a timing chart of the automatic wire connecting process for detecting an inserting load and preventing the occurrence of buckling, and FIG. 5 is a flow chart. In FIG. 4, S1 is an output of the optical sensor 100. When the wire 1 is in the detecting range of the optical sensor 100, "High" is outputted from the optical sensor 100. When the wire 1 is forced outside of the detecting range of the optical sensor 100, "Low" is outputted from the optical sensor 100. Referring to the timing chart of FIG. 4 and the flow chart of FIG. 5, operation of the automatic wire connecting process will be explained as follows. S2 is a signal to turn on and off the rotation (normal rotation) of the torque motor 6 in the feeding direction. S3 is a signal to turn on and off the rotation (reverse rotation) of the motor 6 in the rewinding direction. In either signal, "High' is to turn on, and "Low" is to turn off. After S2 is turned on and the wire connection is started (S201, S202), the wire 1 is sent out. When the wire 1 is vibrated and the amplitude of the vibration exceeds a detecting distance of the optical sensor 100, "High" and "Low" of the optical sensor 100 are repeated (S215, S203). Further, when the inserting load is increased and S1 becomes "Low" continuously in a period of time not less than a predetermined period of time (T1) (S204), the wire 1 is completely forced out from the detecting range of the optical sensor 100. At this time, S2 is turned off (S207) so as to stop feeding the wire 1. At the same time, S3 is turned on (S208) so as to conduct rewinding the wire 1.

Next, when S1 becomes "High" (S209, S210) and the inserting load is released and straightness of the wire 1 is substantially recovered, S3 is turned off (S211), and after the predetermined period of time T2 has passed (S212), S2 is turned on again (S206), and the wire 1 starts being fed. Even after straightness of the wire 1 has been recovered, the wire 1 continues vibrating for some time. However, when S2 and S3 are stopped for the predetermined period of time T2 at this moment, this vibration is stopped. Therefore, the probability of wire connection can be enhanced when the wire connection is conducted again.

In this case, in FIG. 5, when S3 in which the wire 1 is reversely fed is turned on, the number of times is counted by the counter P (S205), and then the number of times of the reverse feeding motions conducted at the same position by the inserting load can be stored. If the above motions are repeated by the number of times not less than a predetermined number of times (S206), the wire 1 is cut off (S214), and the automatic wire connecting process is started again. Due to the foregoing, in the case where the wire 1 is damaged when the normal feeding motion and the reverse feeding motion are repeated, the occurrence of an error of automatic wire connection can be prevented. In order to discriminate that the reversion has been made by the number of times not more than a predetermined number of times at the same position where the inserting load exists, the counter P for counting the number of times may be reset (S216) when wire feeding (normal rotation) is turned on for a period of time and more (S215).

In FIG. 5, when the motions of the above processes (S201) to (S216) are repeated, processing of preventing the occurrence of buckling with respect to the inserting load capable of conducting a wire connection again in the case of automatic wire connection can be realized, and further the reliability of wire connection can be enhanced. Accordingly, it is possible to decrease the number of times of connecting the wire again. Therefore, it is possible to reduce the total automatic wire connecting time.

Embodiment 2

With respect to the inserting load, the slower the normal rotation feeding rate is reduced, the higher the reliability of automatic wire connection can be enhanced. Therefore, in the first embodiment shown in FIG. 6, after the normal rotation feeding motion and the reverse rotation feeding motion have been repeated by a predetermined number of times, a rate of the normal rotation feeding motion may be decreased. This is shown in the second embodiment.

Figure 6:
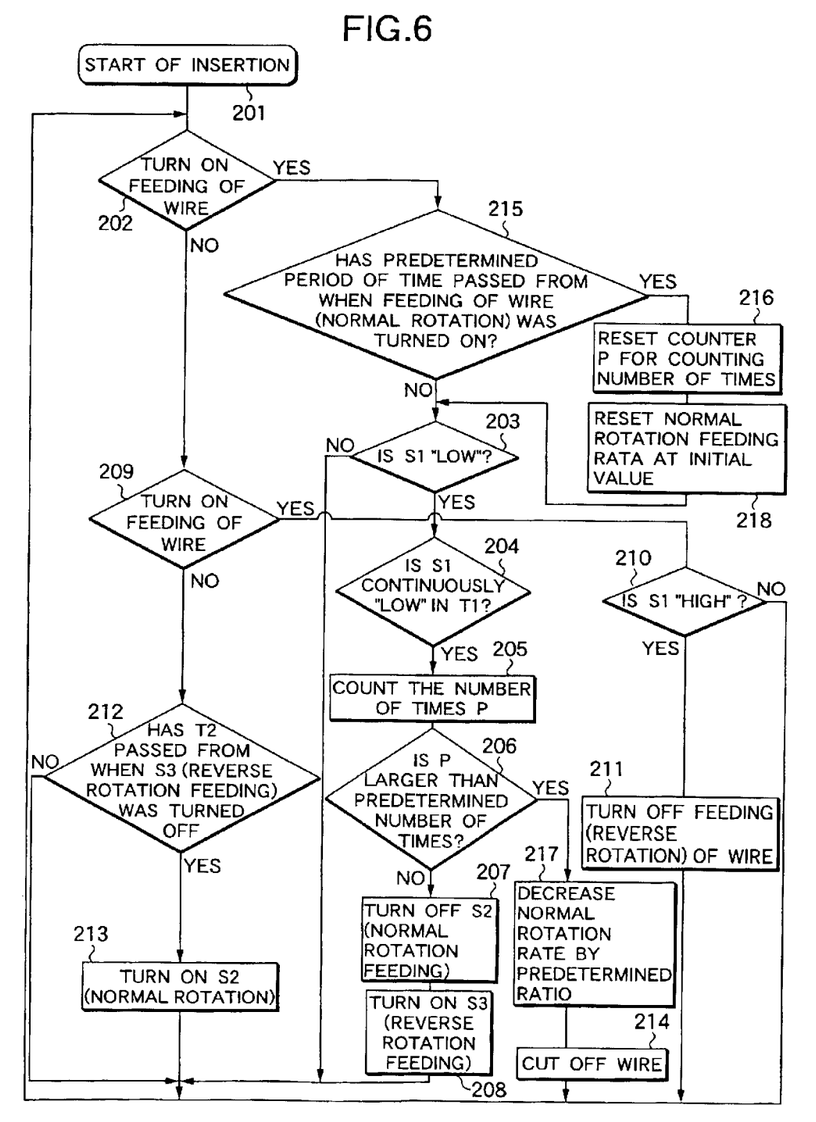
FIG. 6 is a flow chart for explaining the operation of an automatic wire electrode connecting process showing the second embodiment of the invention.

In FIG. 6, explanations of the same motions as those of the first embodiment are omitted here. When the counted number of times P has increased to a value not less than a predetermined number of times (S206), the normal rotation feeding rate is reduced by a predetermined ratio (S217), and the wire 1 is cut off and the automatic wire connecting process is started again. When the normal rotation feeding motion has continued for a predetermined period of time with respect to the inserting load (S215), the counter P is reset (S216), and the normal rotation feeding rate is reset at the initial value (S218). Due to the foregoing, when the inserting load is heavy, the feeding rate of the wire 1 can be decreased, and when the inserting load is light, the feeding rate of the wire 1 can be increased. Therefore, the reliability of automatic wire connection can be enhanced, and a period of time necessary for automatic wire connection can be reduced.

As explained above, an automatic wire feeder of a wire electric discharge machine of the first invention comprises: an optical sensor for detecting positional information of a wire electrode in an inserting passage between a feed roller for feeding a wire electrode and an upper wire guide; and a control unit for discriminating a state of vibration or deflection of the wire electrode according to the positional information detected by the optical sensor and also for controlling a feeding and rewinding motion of the feed roller according to a quantity of deflection of the wire electrode. Therefore, the occurrence of buckling caused by the inserting load in the process of automatic wire connection can be positively detected, and the reliability can be enhanced and further the repetition of wire connection can be reduced.

An automatic wire feeder of a wire electric discharge machine of the second invention includes a control unit, wherein the control unit stops a feeding motion of the feed roller when the quantity of deflection of the wire electrode is increased by a predetermined quantity in the feeding motion of the feed roller, the control unit starts rewinding after a predetermined period of time, the control unit stops rewinding when the quantity of deflection of the wire electrode is decreased by a predetermined quantity in the rewinding motion, and the control unit starts feeding the wire electrode after a predetermined period of time. Therefore, it is possible to enhance the reliability in the case of connecting the wire again.

An automatic wire feeder of a wire electric discharge machine of the third invention comprises a control unit having a rate changeover means, wherein the rate changeover means reduces a feeding rate of the feed roller according to the number of times of execution of the rewinding motion. Therefore, the reliability of automatic wire connection can be enhanced, and a period of time necessary for automatic wire connection can be reduced.

An automatic wire feeder of a wire electric discharge machine of the fourth invention is characterized in that a direction in which the directivity of the optical sensor is narrow is made to agree with a direction of the normal line of the surface of the feed roller for feeding the wire electrode. Accordingly, when a detection range with respect to the vibration of the wire electrode in the tangent direction is extended, the over-detection can be prevented. On the contrary, when a detection range with respect to the vibration of the wire electrode in the normal line direction is reduced, the detection sensitivity can be enhanced.

INDUSTRIAL APPLICABILITY

As described above, according to an automatic wire electrode feeder of a wire electric discharge machine of the present invention, buckling of a wire electrode caused by an inserting load in the process of automatic wire connection can be positively detected and the reliability of connecting the wire again can be enhanced.

What is claimed is:

1. An automatic wire feeder of a wire electric discharge machine comprising: an optical sensor for detecting positional information of a wire electrode in an inserting passage between a feed roller for feeding a wire electrode and an upper wire guide; and a control unit for discriminating a state of vibration or deflection of the wire electrode according to the positional information detected by the optical sensor and also for controlling a feeding and rewinding motion of the feed roller according to a quantity of deflection of the wire electrode.

2. An automatic wire feeder of a wire electric discharge machine according to claim 1, wherein the control unit stops a feeding motion of the feed roller when the quantity of deflection of the wire electrode is increased by a predetermined quantity in the feeding motion of the feed roller, the control unit starts rewinding after a predetermined period of time, the control unit stops rewinding when the quantity of deflection of the wire electrode is decreased by a predetermined quantity in the rewinding motion, and the control unit starts feeding the wire electrode after a predetermined period of time.

3. An automatic wire feeder of a wire electric discharge machine according to claim 1 or 2, wherein the control unit reduces a feeding rate of the feed roller according to the number of times of execution of the rewinding motion.

4. An automatic wire feeder of a wire electric discharge machine according to claim 1 or 2, wherein a direction in which the directivity of the optical sensor is narrow is made to agree with a direction of the normal line of the surface of the feed roller for feeding the wire electrode.

* * * * *